No. 625,860. Patented May 30, 1899.
W. R. THORNTON.
IRRIGATING SYSTEM.
(Application filed July 1, 1898.)
(No Model.)
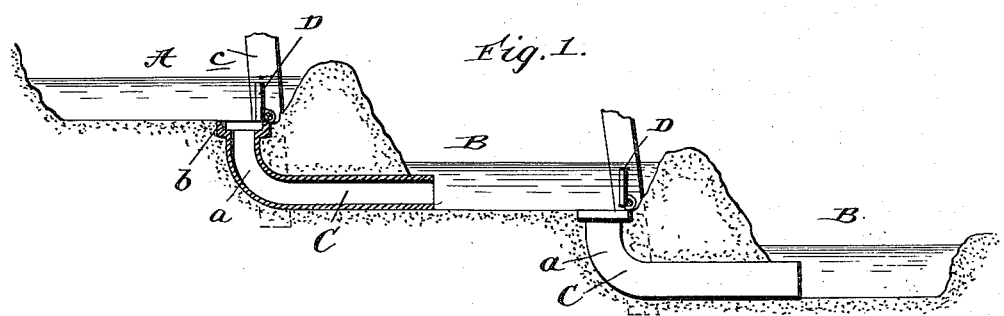
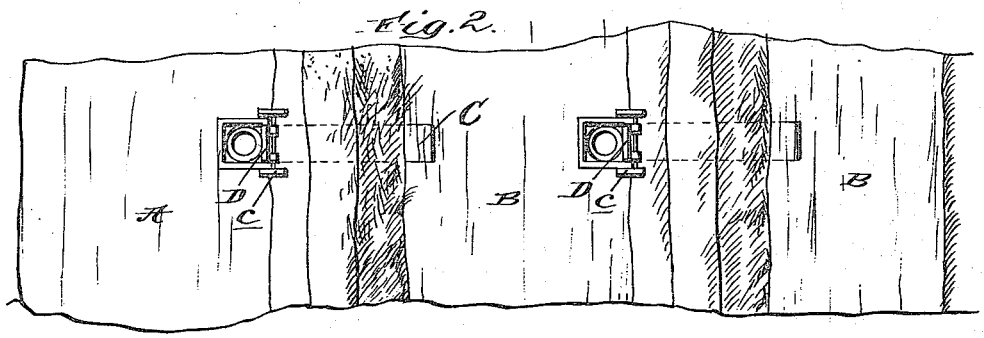
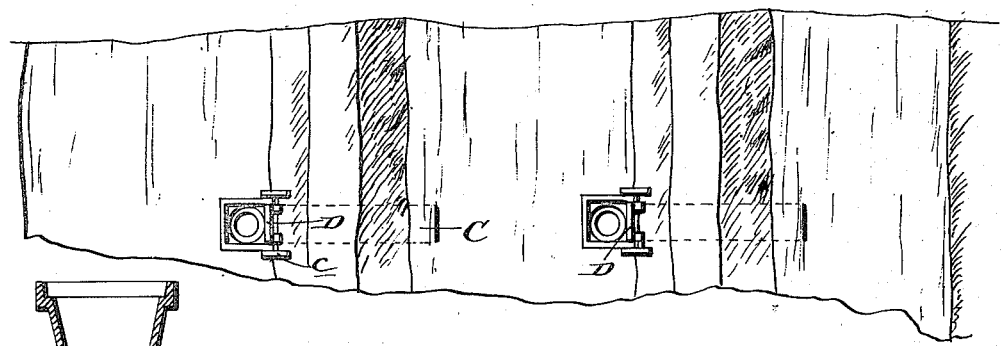
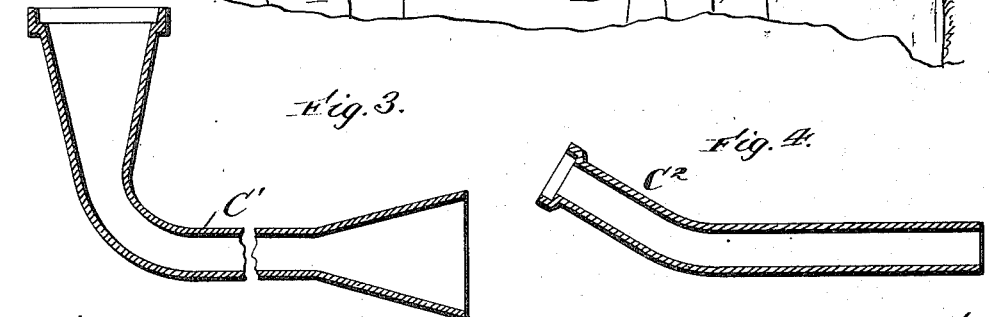
Witnesses:
Inventor
W. R. Thornton
By James J. Sheehy
Attorney

UNITED STATES PATENT OFFICE.

WILBER R. THORNTON, OF BERTHOUD, COLORADO.

IRRIGATING SYSTEM.

SPECIFICATION forming part of Letters Patent No. 625,860, dated May 30, 1899.

Application filed July 1, 1898. Serial No. 684,931. (No model.)

*To all whom it may concern:*

Be it known that I, WILBER R. THORNTON, a citizen of the United States, residing at Berthoud, in the county of Larimer and State of Colorado, have invented new and useful Improvements in Irrigating Systems, of which the following is a specification.

My invention relates to irrigating systems, and more particularly to water-drops and checks which have for their purpose to conduct water in steps from an elevated canal or main supply down an inclined plane or hillside and check its progress *en route*, so as to prevent its washing away the earth and forming dangerous excavations and also prevent its being wasted.

The invention contemplates the provision of a cheap, simple, and durable water-drop and one which is adapted to be easily placed in position and when so placed is not liable to be washed out.

It also contemplates providing the drops with valves at their inlet ends and so arranging the same with respect to the ditches or checks running parallel or approximately parallel to the canal or main supply that all of the descending water or any portion of it may be turned into one or more of the ditches, as desired.

With the foregoing ends in view the invention will be fully understood from the following description and claims, when taken in conjunction with the annexed drawings, in which—

Figure 1 is a section illustrating an elevated canal or main supply, a plurality of ditches or checks arranged parallel to the canal on an inclined plane or hillside, and two of my improved valved water-drops arranged in a series disposed at right angles to the canal or main supply. Fig. 2 is a plan view illustrating two series of drops, which in practice are generally placed one hundred and fifty or two hundred feet apart. Figs. 3 and 4 are sectional views of modified forms of drops.

Referring by letter to the said drawings, and more particularly to Figs. 1 and 2 thereof, A is a canal or main supply which is lateral to the inclined plane or hillside to be irrigated.

B are ditches or checks arranged one above the other on a hillside and parallel or approximately parallel to the canal, and C are my improved water-drops, which are interposed between the canal A and the uppermost ditch B and also between the several ditches and are arranged in line at right angles or approximate right angles to the canal, as shown. The said drops are in the form of pipes and are preferably made of terra-cotta, iron, or other material calculated to withstand the action of water and are bent, as indicated by $a$, so that their receiving ends will rest in a plane above their discharge ends and a drop will be afforded between said ends. They are placed as shown in Fig. 1— that is to say, are buried in the ground with their ends alone exposed, whereby it will be seen that there is no liability of their being washed out.

The receiving ends of the drops are arranged flush with the bottoms of the ditches from which they receive and are provided with outwardly-directed flanges $b$, which form seats for valves D. These valves may be of any suitable construction; but I prefer to pivotally mount them between uprights $c$, rising from the ground, as shown. I also prefer to employ some suitable means—that disclosed in my application filed June 24, 1898, for instance—for locking the valves in various positions.

By reason of my improvements when the valve of the uppermost drop is open water will flow from the canal or main supply through the said drop into the uppermost ditch. If the valve of the second drop from the top is closed, such water will run along the uppermost ditch and irrigate the land contiguous thereto. If, on the other hand, the valve of the second drop from the top is open, the descending water will pass from the uppermost ditch through the said drop into the next lower ditch. In the event of the valve of the uppermost drop being entirely open and that of the second drop partially closed a portion of the water supplied to the uppermost ditch will remain therein and irrigate the land contiguous thereto, while the remainder of the water will pass through the second drop into the second ditch from the top, and so on.

It is obvious that as many drops and as many ditches may be employed as the conditions require. It is also obvious that when the water is to be conducted from an elevated canal to the base of a hill and there distributed the several ditches may be dispensed with and the drops made to discharge into and receive from holes or checks in the ground— that is to say, the uppermost drop will receive from the canal and discharge into a hole and the second drop will receive from a hole and discharge into a second lower hole, as will all of the lower drops with the exception of the lowermost one, which will discharge into a ditch. This latter ditch may be provided with any desired number of laterals to irrigate the land contiguous thereto.

When holes are employed between the drops, the uppermost drop alone need be provided with a valve.

No matter whether the drops discharge into and receive from ditches or holes the operation is the same—that is to say, the water is dropped or conducted down the hill or inclined plane step by step and is checked at each ditch or hole. In consequence it will be seen that there is no danger of the water making a large and dangerous excavation in the hillside and no danger of the water being wasted, which is an important advantage. It will also be seen that there is no danger of the holes or ditches being enlarged by the head of inflowing water, since the water therein will cushion such inflowing head.

The term "check" herein employed is intended to comprehend a ditch as well as a hole in the ground.

In Fig. 3 I have shown a modified form of drop C', which has its receiving and discharge ends flared, so as to facilitate the entry and exit of water.

In Fig. 4 is shown another modified form of drop $C^2$, which is similar to that shown in Figs. 1 and 2 except that it is bent at obtuse instead of at right angles.

Having thus described my invention, what I claim is—

1. An irrigating system comprising an elevated canal or main supply, a series of checks arranged one above the other in a hillside or inclined plane, drops interposed between the canal and the uppermost check and also between the several checks; the said drops being formed by pipes buried in the ground with their ends alone exposed and having valve-seats at their receiving ends, and valves for controlling the receiving ends of the drops, substantially as specified.

2. An irrigating system comprising an elevated canal or main supply, a series of ditches arranged one above the other in a hillside or inclined plane and parallel to the canal or main supply, drops interposed between the canal and the uppermost ditch and also between the several ditches; the said drops being formed by pipes buried in the ground with their ends alone exposed, and valves for controlling the receiving ends of said drops, substantially as specified.

In testimony whereof I have hereunto set my hand in presence of two subscribing witnesses.

WILBER R. THORNTON.

Witnesses:
H. A. LOVEJOY,
JOHN BUNYAN.